3,306,893
PHENOXYMETHYLPENICILLIN CARBO-TER-BUTOXYMETHOXYAMIDE
Piero Sensi and Carolina Coronelli, both of Milan, Italy, assignors to Lepetit S.p.A., Milan, Italy
No Drawing. Filed Nov. 26, 1963, Ser. No. 326,251
Claims priority, application Great Britain, Dec. 4, 1962, 45,817/62
2 Claims. (Cl. 260—239.1)

The present invention relates to new pharmacologically active compounds. Particularly it is concerned with new phenoxymethylpenicillin derivatives of the formula

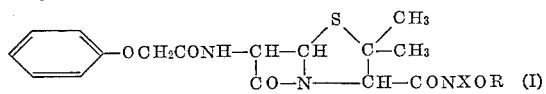

wherein X is hydrogen or a lower alkyl, R is a carboxyalkyl, carbalkoxyalkyl, carboxyaralkyl or carbalkoxyaralkyl radical.

The compounds of the invention are prepared by condensing under anhydrous conditions phenoxymethylpenicillinic ethoxyformic anhydride, in turn prepared by reacting ethyl chloroformate and trimethylammonium phenoxymethylpenicillin at about 0° in a solvent with the selected O-substituted hydroxylamine according to the following scheme

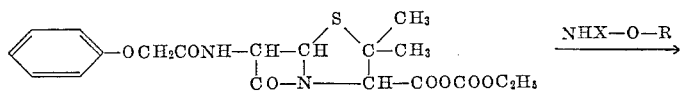

The new penicillins of the invention, besides a high antibacterial activity against penicillin G and V sensitive strains, possess a high activity also against strains of penicillin-resistant staphylococci.

The minimal inhibitory concentration was determined against *M. aureus* with a $10^3$ and a $10^6$ inoculum and against two strains of penicillinase producing bacteria, Staph. 43 and Staph. 46, isolated from pathological sources, using a $10^6$ inoculum. The results obtained with some representative members of the class are hereinafter tabulated.

| X[1] | R[1] | M. aureus | | Staph. 43 | Staph. 46 |
|---|---|---|---|---|---|
| | | Inoculum | | | |
| | | $10^3$ | $10^6$ | $10^6$ | $10^6$ |
| H | CH(C₂H₅)CO₂C₂H₅ | 0.1 | 1.0 | 50.0 | 50.0 |
| H | CH(CO₂H)CH₂C₆H₅ | 0.05 | 0.5 | >100.0 | >100.0 |
| H | CH(CH₂C₆H₅)CO₂C(CH₂)₃ | 0.2 | 2.0 | 20.0 | 10.0 |
| H | CH(C₆H₅)CO₂C(CH₃)₃ | 0.5 | 1.0 | >100.0 | >100.0 |
| H | CH₂C₆H₄CO₂H-m | 0.2 | 1.0 | 50.0 | 50.0 |
| H | CH₂CO₂C(CH₃)₃ | 0.005 | 0.1 | 2.0 | 5.0 |
| H | CH(CH₃)CO₂C(CH₃)₃ | 0.5 | 5.0 | 10.0 | 10.0 |
| H | CH₂CH₂CH₂C₆H₄CO₂H-p | 0.2 | 2.0 | 5.0 | 5.0 |
| H | CH₂CH₂CH(C₆H₅)CO₂H | 0.005 | 0.5 | 100.0 | 100.0 |
| H | CH(CH₃)C₆H₄CO₂H-p | 2.0 | 5.0 | 50.0 | 50.0 |
| H | CH₂CH₂C₆H₄CO₂H-p | 1.0 | 2.0 | 50.0 | 50.0 |

[1] See generic formula above.

The activity against penicillin resistant staphylococci has been indirectly confirmed by resistance tests against penicillinase. In an experiment carried out under identical conditions and with identical quantities of enzyme, penicillin G was practically 100% destroyed in 30 minutes, while phenoxymethylpenicillin O-methylhydroxylamine was destroyed only in a 7.5% ratio. The inactivation of the other penicillins listed in the above table ranged between 5 and 25%.

O-substituted hydroxylamides of penicillin V possess a high stability under acidic conditions such as to allow oral administration of the antibiotic. Penicillin V O-methylhydroxylamide in acidic conditions (pH 1) gave a potency of 95% after 30 minutes and of 85.4% after 60 minutes. Under identical conditions penicillin V is present in a 90% ratio after 30 minutes and in a 75.4% ratio after 60 minutes.

When the therapeutic use of these substances is intended for parenteral route, it is preferable to use those derivatives which contain in the molecule solubilizing groups, such as a carboxy group and its functional derivatives, such as carbalkoxy groups. Such penicillin derivatives have the advantage of a high solubility in water, which permits the preparation of injectable compositions.

EXAMPLE 1

*Preparation of penicillin V methoxyamide*

To 10 gr. of penicillin V, suspended in 50 ml. of anhydrous chloroform, 4.2 ml. of triethylamine are added. The clear solution is cooled to 0° C. and 2.7 ml. of ethyl chloroformate are added. After 30 minutes at 0° C. the formation of the mixed anhydride of penicillin V and ethoxyformic acid is complete. To a suspension of 2.550 gr. of O-methylhydroxylamine hydrochloride in 100 ml. of anhydrous chloroform 4.2 ml. of triethylamine are added. The chloroform solution is cooled and rapidly added under stirring to the mixed anhydride solution. The reaction occurs at 0° C. in half an hour and is completed by allowing the temperature to rise to room temperature for some hours. The chloroform solution is then washed with an equal amount of 0.1 M citric acid with a 0.2 M disodium phosphate solution and finally with water to neutral reaction The chloroform is concentrated in vacuo to 1/10 of its volume and poured into 10 times its volume of petroleum ether. A white precipitate forms, which is collected and dried giving 6.800 gr. of crude product. The I.R. spectrum shows disappearance of the OH-stretching of the carboxy group in the region between 2900–2600 cm.⁻¹; the disappearance of the C=O stretching band of the carboxy group at 1724 cm.⁻¹; the increase of the amide band at about 1690 cm.⁻¹ in respect with that of the C=O stretching of the beta-lactam ring at 1795 cm.⁻¹.

The presence of traces of penicillin V in the crude product is determined by chromatographic separation with a mixture of butanol-ethyl ether-water acetone (7:2:2.5:2) in which penicillin V has an R$f$ value of 0.5 and the amide of 0.9. By microbiological development of the chromatograms on *B. subtilis* it is possible to detect traces of penicillin V as low as 0.2%.

In the case where penicillin V is present in substantial quantity the product is dissolved in ethyl acetate and the solution is thoroughly washed with an aqueous solution of 2% sodium bicarbonate and then with water to neutral reaction. The ethyl acetate is distilled in vacuo to a small volume and the product precipitated by dilution with petroleum ether. After the above described washing no more impurities are present. The product is recrystallized from benzene.

EXAMPLES 2 TO 19

The procedure of Example 1 was followed, with minor modifications according to the properties of the individual hydroxylamines selected as starting materials, for preparing a lot of representatives of the claimed class. A list is given hereinafter of a number of starting hydroxylamines which gave useful penicillin V derivatives.

O-phenethylhydroxylamine
O-(beta-methyl)-phenethylhydroxylamine
O-(2-hydroxyethyl)-hydroxylamine
O-(alpha-ethyl)-carbethoxymethylhydroxylamine
O-(alpha-carboxy)-phenethylhydroxylamine
O-(alpha-carbo-ter-butoxy)-phenethylhydroxylamine
O-(alpha-carbo-ter-butoxy)-benzylhydroxylamine
O-(m-carboxybenzyl)-hydroxylamine
O-(alpha-carbo-ter-butoxymethyl)-hydroxylamine
O-(alpha-carbo-ter-butoxyethyl)-hydroxylamine
O-(alpha-methyl)-phenethyl-N-methylhydroxylamine
O-(beta-methyl)-phenethyl-N-methylhydroxylamine
O-(p-carboxyphenylpropyl)-hydroxylamine
O-(γ-carboxy)-phenylpropylhydroxylamine
O-(alpha-methyl-p-carboxybenzyl)-hydroxylamine
O-benzylhydroxylamine
O-(p-carboxyphenethyl)-hydroxylamine
O-phenylbutylhydroxylamine.

We claim:
1. Phenoxymethylpenicillin carbo-ter-butoxymethoxyamide of the formula

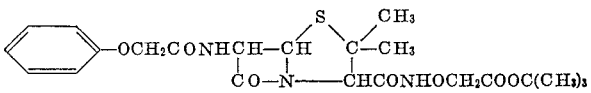

2. A compound of the formula

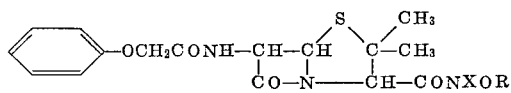

wherein X is a member of the class consisting of hydrogen and a lower alkyl radical, R is a member of the class consisting of 1-carbethoxypropyl, 2-phenyl-1-carboxyethyl, 2 - phenyl - 1-carbo-ter-butoxy-ethyl, α-carbo-ter-butoxybenzyl, m-carboxy-benzyl, carbo-ter-butoxymethyl, 1-carbo-ter-butoxyethyl, p-carboxy-phenylpropyl, 3-carboxy-3-phenylpropyl, 1-p-carboxyphenyl-ethyl, and p-carboxyphenethyl.

References Cited by the Examiner
UNITED STATES PATENTS

| 2,593,852 | 4/1952 | Cooper | 260—239.1 |
| 3,169,127 | 2/1965 | Seto | 260—239.1 |
| 3,177,203 | 4/1965 | Goldberg et al. | 260—239.1 |

NICHOLAS S. RIZZO, *Primary Examiner.*

HENRY R. JILES, ALEX MAZEL, *Examiners.*

J. W. ADAMS, *Assistant Examiner.*